Sept. 25, 1962   R. J. REDDING   3,056,082
ELECTRICAL MEASURING INSTRUMENTS
Filed Dec. 14, 1959
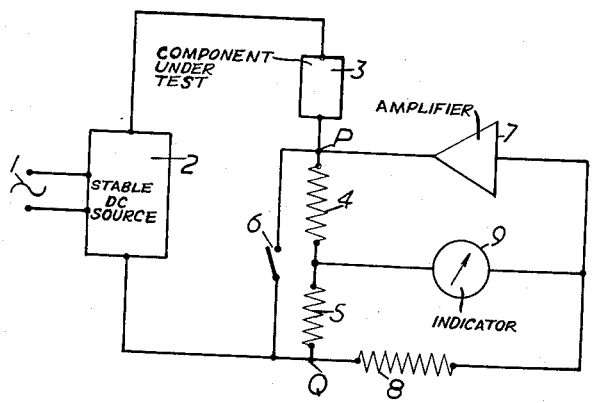
Inventor
Robert J. Redding
By
Kenyon, Palmer and Stewart
Attorneys United States Patent Office 3,056,082
Patented Sept. 25, 1962

3,056,082
ELECTRICAL MEASURING INSTRUMENTS
Robert James Redding, Chiswick, London, England, assignor to Evershed & Vignoles Limited, Chiswick, London, England, a British company
Filed Dec. 14, 1959, Ser. No. 859,392
Claims priority, application Great Britain Dec. 19, 1958
2 Claims. (Cl. 324—62)

This invention relates to electrical instruments for measuring the insulation resistance of an electrical component or circuit and is particularly concerned with such an instrument suitable for use with a capacitor or a capacitive circuit, such for example as an electric cable. In order to obtain accurate results it is firstly necessary that the testing voltage should be extremely stable since any minor fluctuations tend to be magnified by a capacitive circuit and in addition the measuring circuit requires to be extremely sensitive. A suitable type of instrument for this purpose employs a valve voltmeter for measuring the voltage across a standard resistor included in the test circuit. This gives a measure of the current flowing and hence enables the insulation resistance to be deduced. The instrument includes an electronic stabiliser so as to give a steady test voltage.

For practical reasons, such as the reduction of drift in the valve voltmeter, it is convenient for this to operate at potentials of the order of one volt and to give a voltage of this order with the test currents which are used in practice requires standard resistors having values in the range of, for example, 1 to 100 megohms. When the test is carried out the capacitor must, of course, first be charged before the leakage current can be measured and the inclusion of the large standard resistor in the circuit reduces the charging current to such a low value that the charging may take a matter of minutes. The rate of charging may be increased by short-circuiting the standard resistor during charging and then removing the short-circuit connection when charging is complete. Although this increases the speed of operation it still involves considerable delay because as soon as the short-circuit connection across the standard resistor is removed, the charging voltage across the capacitor is slightly reduced and some time is still necessary before equilibrium is reached since it is, of course, the final stages in the approach to equilibrium which takes place so slowly.

According to the present invention a measuring instrument of the kind referred to above, that is to say having a stable source of direct current voltage for supplying a circuit or component under test connected in series with a standard resistor has, in addition, a feedback resistor connected in series with the standard resistor and the series combination these two resistors is bridged by a short-circuiting switch. The standard resistor has connected across it on amplifier supplying an indicator for measuring the potential difference across the standard resistor and hence the resistance of the circuit or component under test, while the feedback resistor has connected across it a circuit providing a potential substantially equal and opposite to that developed across the standard resistor by the passage of the test current.

During the initial stage of a test the short-circuiting switch is closed and as a result any capacitor in the circuit or component under test is allowed to receive its full charge and reach an equilibrium condition in a short period of time. Since, however, the potentials across the standard resistor and the feedback resistor are equal and opposite, the opening of the short-circuiting switch to complete the test does not upset the equilibrium of the circuit. Expressed in other terms the presence of the feedback voltage prevents any appreciable reduction in the voltage across the capacitor when the short-circuit across the standard resistor is removed and substantially the full test voltage is applied to the component or circuit under test. Once this short-circuit is removed the potential across the standard resistor then provides the required indication of the insulation resistance and is shown directly on the indicator supplied by the amplifier. This combination of amplifier and indicator, is of course, the equivalent of a valve voltmeter and indeed a normal valve voltmeter may be used for the purpose.

Preferably the feedback voltage is derived from the output of the amplifier itself although other forms of feedback circuit may also be used. The output voltage of the amplifier is, of course, greater than the voltage across the standard resistor by a factor depending on the gain of the amplifier but by tapping off a suitable portion of this output voltage a feedback voltage equal and opposite to the voltage across the standard resistor may readily be derived.

A measuring instrument in accordance with the invention will now be described in more detail by way of example with reference to the accompanying drawing which is a schematic circuit diagram. The instrument requires to be connected to a source of alternating current supply shown as 1 from which a stable direct current is derived by means of a circuit 2 which includes a rectifier and a stabilising circuit. The circuit or component under test is shown as 3 and is connected in series with a standard resistor 4 and a feedback resistor 5, the series combination of these two resistors being bridged by a short-circuiting switch 6. The standard resistor 4 has connected across it an amplifier 7, the output of which appears across the resistor 5 and a further resistor 8 and is measured by an indicator 9. The combination of the two resistors 5 and 8 constitutes a potential divider and by suitable selection of the magnitudes of these two resistors in relation to the gain of the amplifier, the feedback voltage across the resistor 5 may be made equal and opposite to that across the standard resistor 4, as a result of which points P and Q are maintained at equal potentials.

During the initial stage of a test the short-circuiting switch 6 is closed and as a consequence any capacitor included in the component or circuit under test 3 is fully charged in a very brief period of time. The switch 6 may then be opened without in any way upsetting the equilibrium because, as previously mentioned, the points P and Q are at the same potential. When the switch has been opened, however, the voltage developed across the standard resistor 4 provides a measure of the insulation resistance and the required reading may be taken directly from the indicator 9. It is found in practice that with the circuit illustrated a true reading of the insulation resistance can be obtained approximately ten times faster than was previously possible.

As previously mentioned the amplifier 7 and the indicator 9 may be constituted by a normal form of valve voltmeter although the two components are shown separately for convenience. In previous circuits using a valve voltmeter without feedback, it has been necessary to keep the input to the valve voltmeter down to a very small value, for example one hundredth of the total test voltage, in order to keep the effect described above to small proportions. Obviously the higher the input voltage to the valve voltmeter, the larger the standard resistor required and the greater the disturbance when the short-circuit across this resistor was removed at the end of the charging period. With a circuit in accordance with the invention these considerations no longer apply since the loss of voltage across the standard resistor is counteracted by the feedback. Accordingly the valve voltmeter may have a much larger input, for example one-tenth of the total test voltage. In other words, if the input to the valve voltmeter is kept the same, the test voltage may be reduced, for example by a factor of ten and if, for example, a voltmeter working up to one volt is used, the test voltage may be adjustable between say ten and five hundred volts.

I claim:

1. Apparatus for measuring the resistance of electrical insulation comprising: a stable source of direct current voltage; a standard resistor; a feedback resistor; means affording connection of a component to be tested in series circuit relation with said source, said standard resistor and said feedback resistor; means for short-circuiting said standard and feedback resistors; amplifying means having its input connected across said standard resistor; indicating means connected in the output circuit of said amplifier; and means for applying a voltage across said feedback resistor which is equal to but of opposite polarity to the voltage across said standard resistor.

2. Apparatus as defined by claim 1 in which said last mentioned means comprises means connected between said feedback resistor and the output of said amplifier.

References Cited in the file of this patent

UNITED STATES PATENTS 2,719,262     Bousman _____ Sept. 27, 1955

OTHER REFERENCES

Scroggie: "Measuring High Resistance," Wireless World, June 1952, pp. 236–238.

Scroggie: "A valve Megohmmeter," Wireless World, November 1953; pp. 516–520.

Konigsberg: "Operational Bridge Gages High Capacitance," Electronics, January 1, 1957; pp. 175–177.